(12) United States Patent
Ciari

(10) Patent No.: US 9,426,971 B2
(45) Date of Patent: Aug. 30, 2016

(54) MAGNETIC LINE AND LURE RESTRAINT FOR ENHANCED CASTING

(71) Applicant: James R. Ciari, Lakewood, CO (US)

(72) Inventor: James R. Ciari, Lakewood, CO (US)

( * ) Notice: Subject to any disclaimer, the term of this patent is extended or adjusted under 35 U.S.C. 154(b) by 313 days.

(21) Appl. No.: 13/999,130

(22) Filed: Jan. 22, 2014

(65) Prior Publication Data

US 2015/0201600 A1    Jul. 23, 2015

(51) Int. Cl.
*A01K 87/00*    (2006.01)
*A01K 91/02*    (2006.01)

(52) U.S. Cl.
CPC ..................................... *A01K 91/02* (2013.01)

(58) Field of Classification Search
USPC ............................................. 43/25.2, 25, 4.5
See application file for complete search history.

(56) References Cited

U.S. PATENT DOCUMENTS

| | | | |
|---|---|---|---|
| 3,026,644 A * | 3/1962 | Raider | A01K 91/02 124/26 |
| 3,484,980 A | 12/1969 | Wait | |
| 3,815,273 A * | 6/1974 | Perkins | A01K 97/06 43/25.2 |
| 3,971,151 A * | 7/1976 | Banner | A01K 97/06 43/24 |
| 4,566,217 A * | 1/1986 | Geary, Sr. | A01K 91/02 43/19 |
| 5,172,509 A | 12/1992 | Motovik | |
| 7,434,757 B2 * | 10/2008 | Beckham | A01K 89/0155 242/223 |
| 8,407,928 B2 * | 4/2013 | Brown | A01K 97/06 43/25.2 |
| 2007/0056204 A1 | 3/2007 | Adams | |

* cited by examiner

*Primary Examiner* — Christopher P Ellis
(74) *Attorney, Agent, or Firm* — Harold A. Burdick

(57) ABSTRACT

Apparatus and methods are disclosed for line and lure restraint to enhance spin casting. The apparatus is mountable to a fishing rod adjacent to a line reel maintained on the rod and includes a mount having a positioning arm with a mounting clip at one end and a platform at an opposite end. A neodymium ring magnet with first and second steel washers at opposite sides thereof is located on a bushing. An axial securement rotatably secures this assembly at the platform. The positioning arm is configured to selectively locate the magnate assembly relative to the rod and reel.

17 Claims, 2 Drawing Sheets

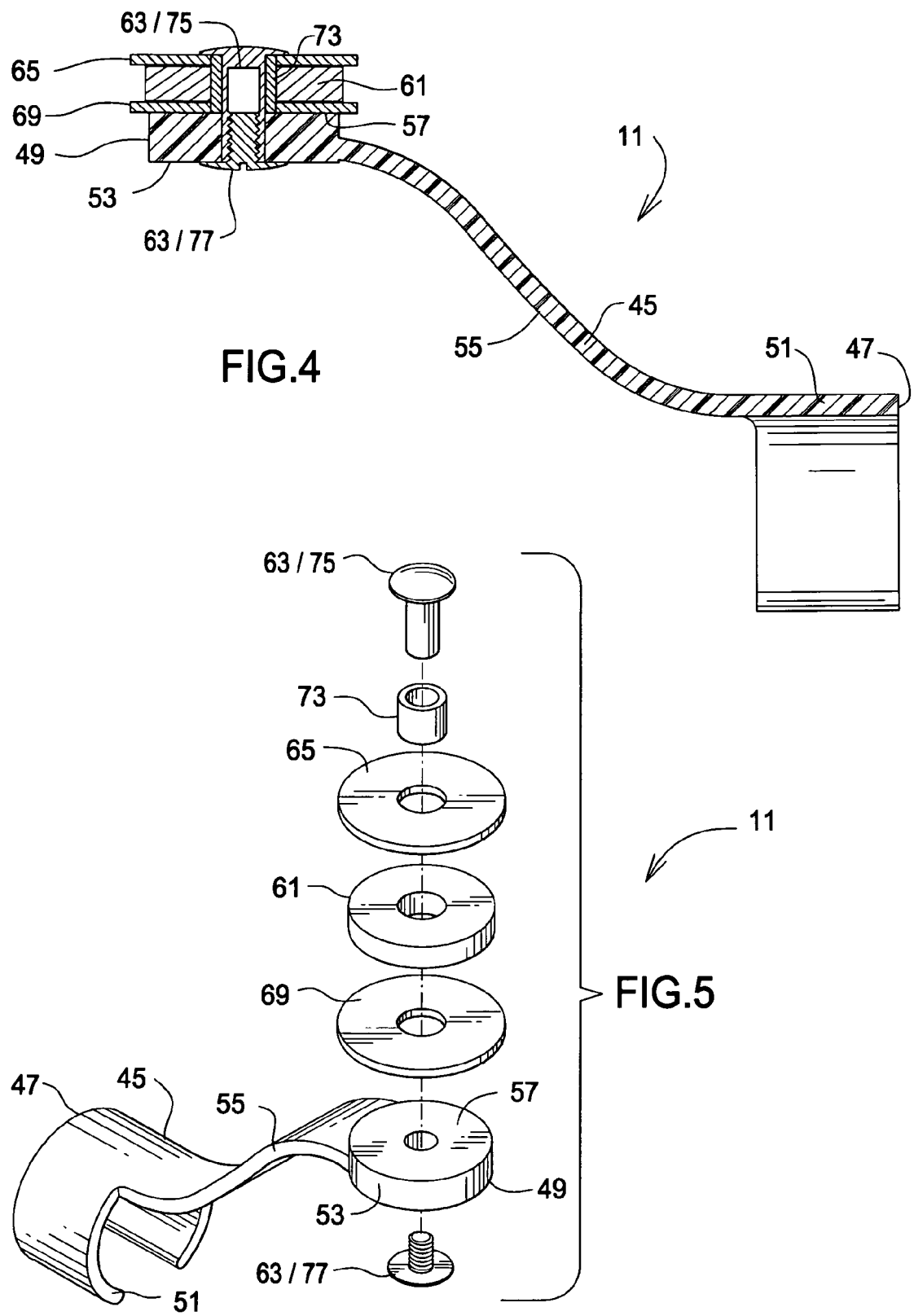

MAGNETIC LINE AND LURE RESTRAINT FOR ENHANCED CASTING

FIELD OF THE INVENTION

This invention relates to fishing apparatus and methods and, more particularly, relates to apparatus and methods for enhanced spin casting when using lures.

BACKGROUND OF THE INVENTION

Spin casting using artificial lures is a widely practiced sport. This type of angling activity is quiet often done from shore (stream or lake side, for example) and makes use of rods and reels adapted to the practice. Many types of lures (artificial bait or attractants) are known and/or utilized, such as wet and dry flies, poppers, spoons, jigs, plugs, and the like. Of most pertinence to this invention is the popular practice of spin casting using wet or dry flies where the fly or flies are secured on a fishing line spaced from a bobber, bubble, float or the like (or, in some cases, using combinations of floats and weights). Since, as noted, this sport is often practiced from the shoreline, the terrain and vegetation of the particular area must be considered when deciding from where to cast, since some locations severely restrict the usual arc of line and lure movement during the cast. This has often heretofore meant that otherwise promising locations may be essentially unfishable for the spin casting enthusiast. Adaptations for restraining line and lure movement during casting could thus prove useful so long as such restraint does not diminish quality of the cast.

Various types of ancillary rod mountable equipment for holding a fishing hook adjacent to a rod are known and or utilized (see, for example, the fly retainer shown in U.S. Pat. No. 5,172,509). Some such hook keepers use magnets therein to help retain the hook in a hook retention assembly or shielding sleeve (see U.S. Pat. Nos. 3,484,980 and 3,815,980, and U.S. Patent Publication No. 2007/0056204). However, these devices are suitable only for holding a hook or lure attached to a line at a position immediately adjacent to a fishing rod when not in use, and are neither adapted for nor capable of any other function. Such heretofore known devices are thus of very limited utility since many rods include built-on hook keepers for just this purpose.

SUMMARY OF THE INVENTION

This invention provides apparatus and methods for magnetic line and lure restraint at a fishing rod for enhanced casting in difficult locations. The apparatus and methods are of particular utility in the popular practice of spin casting using wet or dry flies and a float. While primarily thus adapted, other applications using different lure types or even, in some adaptations, bait can be achieved.

The apparatus is mountable to a fishing rod having a rod length and adjacent to a fishing line reel maintained on the rod. A mount securable to the rod at one end includes an opposite end with a positioning arm between the ends. The positioning arm is configured to position the opposite end a selected distance from the one end relative to the rod length and with a selected lateral spacing from the rod when the mount is secured to the rod. A magnet (preferably a neodymium ring magnet) is affixed on the opposite end of the mount.

The mount includes a mounting clip at the one end for releasable securement to the rod. The opposite end has a platform thereat with a locating surface facing away from the rod when the mount is secured. An axial securement is used to affix the magnet at the locating surface of the platform of the mount.

The method of this invention is adapted for line and lure restraint to enhance spin casting when using a spin casting rod having a tip and a reel seat with a reel mountable thereat. The method includes the steps of mounting a magnet at the rod and positioning the mounted magnet so that the magnet is a selected distance toward the rod tip from the reel seat and with a selected lateral spacing from the rod. This maintains a lure (a fly, for example) attached to the fishing line at a position adjacent to the rod during a significant part of a cast without diminishing overall quality of the cast.

It is therefore an object of this invention to provide magnetic line and lure restraint apparatus and methods for enhanced casting.

It is another object of this invention to provide apparatus and methods for alleviating inhibitions to spin casting in difficult locations.

It is still another object of this invention to provide apparatus and methods for restraining line and lure movement during casting without diminishing quality of the cast.

It is still another object of this invention to provide line and lure restraint apparatus and methods for enhanced spin casting using wet or dry flies and a float.

It is yet another object of this invention to provide magnetic means to hold a fly at a position adjacent to a fishing rod during fly casting.

It is another object of this invention to provide apparatus mountable to a fishing rod having a rod length and adjacent to a fishing line reel maintained on the rod, the apparatus for line and lure restraint to enhance casting and including a mount securable to the fishing rod at one end and having an opposite end, a positioning arm between the one end and the opposite end configured to position the opposite end a selected distance from the one end relative to the rod length when the mount is secured to the rod and with a selected lateral spacing from the rod when the mount is secured to the rod, and a magnet affixed on the opposite end of the mount.

It is still another object of this invention to provide apparatus mountable to a spin casting rod having a rod length and adjacent to a spin casting line reel maintained on the rod, the apparatus for line and lure restraint to enhance casting and including a mount having a mounting clip at one end for releasable securement to the rod and a platform at an opposite end having a locating surface facing away from the rod when the mount is secured thereto, a neodymium ring magnet, and an axial securement for affixation of the ring magnet at the locating surface of the platform of the mount.

It is yet another object of this invention to provide a method adapted for line and lure restraint to enhance spin casting when using a spin casting rod having a tip and a reel seat with a reel mountable thereat, the method including the steps of mounting a magnet at the rod and positioning the mounted magnet so that the magnet is a selected distance toward the rod tip from the reel seat and with a selected lateral spacing from the rod.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 4 is a sectional view taken at section lines 4-4 of FIG. 3; and

FIG. 5 is an exploded view of the magnetic line and lure restraint apparatus of FIG. 1.

DESCRIPTION OF THE INVENTION

Figure 1:
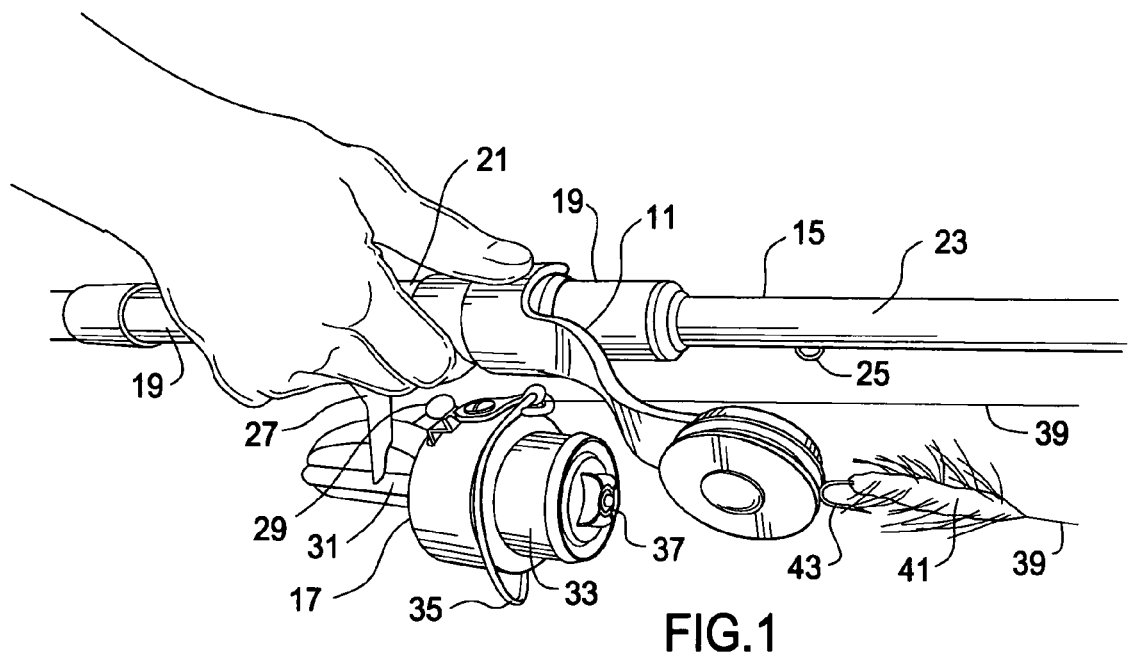
FIG. 1 is a perspective view of the magnetic line and lure restraint apparatus of this invention used in conjunction with a rod and reel.
Figure 2:
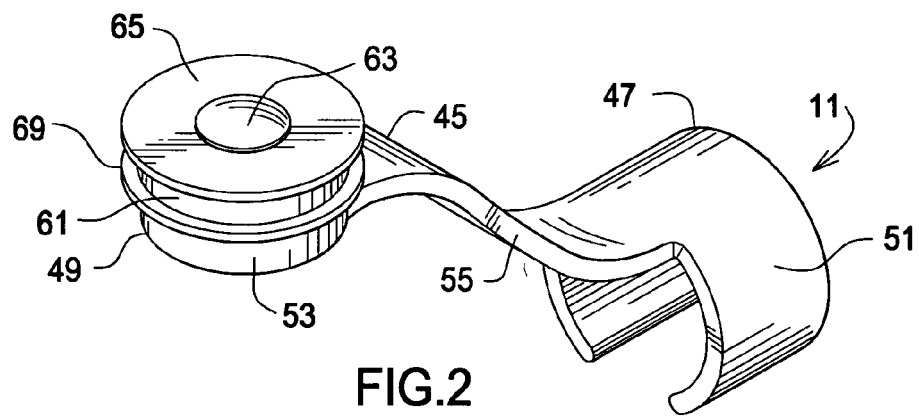
FIG. 2 is a perspective view of the apparatus of FIG. 1.
Figure 3:
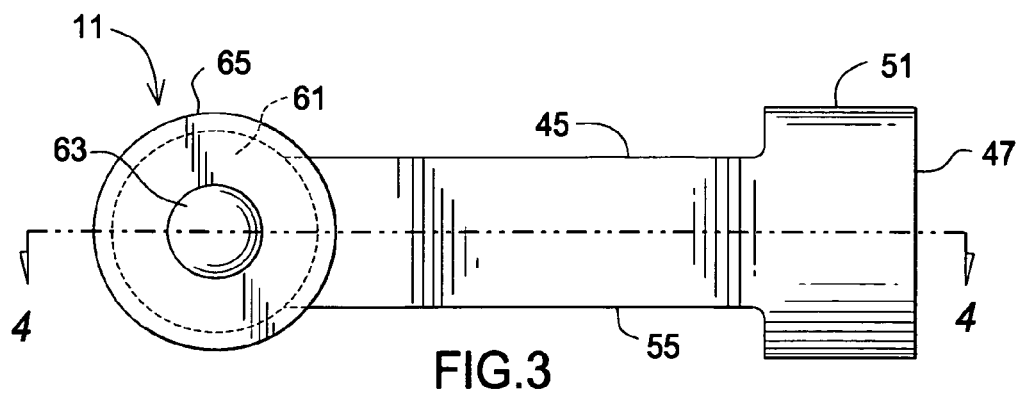
FIG. 3 is a top elevation view of the apparatus of this invention.

Turning now to the FIGURES, apparatus 11 is shown in FIG. 1, mounted on fishing rod 15 and adjacent to line reel 17. Rod 15 shown in the FIGURE is of standard spin casting design and includes handle 19 having reel seat 21 located thereat and a selected number of serially engagable rod blanks 23 (one shown) determining overall rod length from reel seat 21 to the rod tip (the distal end of the final blank 23 and thus of rod 15—not shown). Blanks 23 have a number of size graduated line guides therealong (not shown), a final guide being located at the rod tip distal end. A hook keeper 25 is located on the blank 23 adjacent to handle 19.

Reel 17 is mounted at reel seat 21 of rod 15 at reel seat post 27 (typically utilizing a standard reel clamp design incorporated at handle 19/seat 21 engaging standard reel seat design of reel 17 as is well known). Reel 17, as shown, is a standard spin casting reel design including line control handle 29, gear housing 31, spool 33, bail arm 35, and front drag 37. Fishing line 39 extends from spool 33, around bail arm 35 and through the rod line guides at rod blanks 23. At the end of line 39 is tied a lure 41 (a fly is shown in FIG. 1) having at least one fish hook 43 associated therewith, While not shown in the FIGURE, it is common when casting flies using the outfit shown to have a bobber, bubble or other type of known float attached to line 39 a select distance up the line from lure 41. This type of rigging is well known to casting anglers.

Apparatus 11 will be described in detail having reference to the remaining FIGS. 2 through 5. Apparatus 11 includes mount 45 having opposite ends 47 and 49. Mounting clip 51 (preferably a spring clip design) for releasable securement of apparatus 11 to rod 15 is formed at one end 47 and platform 53 (preferably disc shaped and having a diameter) is formed at opposite end 49. Positioning arm 55 of mount 45 is preferably integrally formed with clip 51 and platform 53 and extends between ends 47 and 49. Arm 55 is configured to position end 49/platform 53 a selected distance from end 47/mounting clip 51 relative to rod 15 length when mounted as shown in FIG. 1 (a selected distance equivalent to at least about 4.5 cm of rod 15 length from reel seat 21 toward the rod top, and preferably about 5.7 cm of rod length between mounting clip 51 and platform 53), and further to position end 49/platform 53 with a selected lateral spacing from rod 15 when thus mounted (a selected lateral spacing of at least about 3 cm between rod 15 and platform 53, and preferably about 4 cm from rod 15 to the top of platform 53 at locating surface 57 facing away from rod 15—see FIGS. 4 and 5).

Magnet 61 (preferably a ring magnet) is affixed at end 49 on locating surface 57 of platform 53, preferably using axial securement mechanism 63 through central openings through magnet 61 and platform 53 for rotational affixation of magnet 61 at surface 57. First and second plates 65 and 69 (preferably steel ring washers) are each held adjacent to an opposite side of magnet 61. The plates each have a larger adjacent surface area (diameter as shown) than surface area of the side of magnet 61 where held (defined by magnet diameter in the case of a ring magnet 61) and, in the case of plate 69, than surface area of locating surface 57 (defined by platform surface diameter as shown). Plates 65 and 69 are also preferably rotatably affixed by mechanism 63 through central openings in the plates.

To enhance rotatable mounting of the magnet 61/plates 65,69 assembly, bushing 73 is provided with the assembly mounted thereon. Axial securement mechanism 63 in such instance is preferably configured as a two segment interconnectable axle assembly (many types of mechanisms are known for this purpose, such as rivet nut or binder post type assemblies, all of which will be generically referred to herein as "rivet-type nut 75 and screw 77" for purposes of this Application). Thus configured, a rotatable magnetic assembly is defined at surface 57 of said platform 53.

Mount 45 is preferably made of dye cast acrylic material with clip 51 dimensions suitable for common rod sizes. Platform 53 preferably has a diameter of about 2.38 cm and is about 6.35 mm thick. Magnet 61 is preferably a ring magnet with a diameter of about 2.54 cm and about 4.37 mm thick, and having a centered hole therethrough about 9.13 mm in diameter. Steel washers 65 and 69, preferably having a diameter about 2.86 cm and each being about 0.8 mm thick, can be constructed of 20 gauge cold rolled steel with a centered hole of about the same size as the hole through magnet 61. Bushing 73 is preferably made of aluminum with a diameter of about 9.13 mm and wall length of about 7.94 mm and thickness of about 1.55 mm. Securement mechanism 63 is preferably made of brass and includes heads at each end of about a 1.25 cm diameter.

The preferred magnet 61 utilized herein is a sintered neodymium iron boron material magnet (commonly called a neodymium magnet), finished with a zinc, nickel or epoxy coating to prevent oxidation. Such magnets have a very high resistance to demagnetization and a high magnetic energy to size ratio. In the case at hand, where a ring magnet is used, such a magnet of the size described hereinabove would have a density of about 7.4 g/cm$^3$, a maximum energy product BH (max) of about 40 MGO, residual induction of about 12,900 Gauss, and intrinsic coercive force (Hci) of about 12,000 Oersteds (coercive force (Hc) of about 10,500 Oersteds). Such a magnet is well adapted to the task at hand and for a wide size variety of lure (flies).

As may be appreciated from the foregoing, apparatus 11 when mounted holds lure/hook 41/43 parallel and adjacent to rod 15 and adjacent to, but forward toward the rod tip of, reel 17 (apparatus 11 is preferably mounted so that it extends at about a 90° angle relative to reel seat post 27). The larger surface area plates 65 and 69 extend the magnetic surface area of the smaller magnet 61. Metal of lure 41 (hook 43 most commonly) is held at the magnet/plates assembly (thus restraining lure 41 and line 39 movement) until force of the cast causes lure release from the influence of magnet 61. Since the magnet assembly rotates on its axis (defined substantially perpendicular to the rod when mounted), self positioning of lure 41 relative to rod tip is achieved thus allowing unobstructed lure release when casting and thereby maintaining cast quality.

The methods are therefore especially well adapted for line and lure restraint to enhance spin casting. In operation, a fisherman will grasp line 39 about 15 to 30 cm above the lure/fly 41 and swing it around to the side of rod 15 from which apparatus 11 extends to be captured by the magnetic assembly including magnet 61 and plates 65/69 (using the preferred magnet as disclosed herein there is about a 15 cm zone of magnetic attractive influence around the magnet/plates combination). The lure is held at this position and is aligned for casting by reel operation. Lure release is caused by the forward snap of the rod tip during casting. The lure thus remains restrained, with fishing line 39 adjacent rod 15, during most of the cast motion, thereby significantly reducing likelihood of lure or line snagging.

Apparatus 11 is easily mounted and dismounted on rod 15 and can be oriented upon mounting for either right of left handed use. Overall weight of the preferred embodiment as described herein is about 56.7 grams. Using the preferred magnet 61 described hereinabove, flies ranging in size from about a No. 8 to about a No. 2 are easily manipulated. Water filled bubble weight can be matched almost ideally to any fly size for refining functionality.

What is claimed is:

1. Apparatus mountable to a fishing rod having a rod length and adjacent to a fishing line reel maintained on the rod, said apparatus for line and lure restraint to enhance casting and comprising:
   a mount securable to the fishing rod at one end and including an opposite end, a positioning arm between said one end and said opposite end configured to position said opposite end a selected distance from said one end relative to the rod length when said mount is secured to the rod and with a selected lateral spacing from the rod when said mount is secured to the rod; and
   a magnet rotatably affixed at said opposite end at said positioning arm of said mount.

2. Claim 1 wherein the fishing rod includes a tip and a reel seat, the apparatus further characterized by said selected distance being sufficient to extend said opposite end of said positioning arm to a position equivalent to at least about 4.5 cm of fishing rod length toward the rod tip from the reel seat and wherein said selected lateral spacing is at least about 3 cm.

3. The apparatus of claim 1 wherein said mount includes a mounting clip at said one end for releasable securement to the rod.

4. The apparatus of claim 1 wherein said mount includes a platform at said opposite end having a locating surface facing away from the rod when said mount is secured thereto, and wherein said magnet is a ring magnet affixed to said locating surface.

5. The apparatus of claim 4 further comprising an axial securement for rotational affixation of said ring magnet at said platform of said mount.

6. The apparatus of claim 1 further comprising first and second plates each held adjacent an opposite side of said magnet, each of said plates having a larger adjacent surface area than surface area of said side of said magnet.

7. Apparatus mountable to a spin casting rod having a rod length and adjacent to a spin casting line reel maintained on the rod, said apparatus for line and lure restraint to enhance casting and comprising:
   a mount including a mounting clip at one end for releasable securement to the rod and a platform at an opposite end having a locating surface facing away from the rod when said mount is secured thereto;
   a neodymium ring magnet; and
   an axial securement for affixation of said ring magnet at said locating surface of said platform of said mount.

8. The apparatus of claim 7 further comprising first and second steel washers each held adjacent an opposite side of said magnet and each having a larger diameter than said ring magnet, said washers held by said axial securement.

9. The apparatus of claim 7 wherein said mount includes a positioning arm between said clip and said platform configured to position said platform a selected distance from said clip relative to the rod length when said mount is secured to the rod and with a selected lateral spacing from the rod when said mount is secured to the rod.

10. The apparatus of claim 7 further comprising a bushing having said ring magnet mounted thereon and said axial securement therethrough thus defining a rotatable assembly at said locating surface of said platform.

11. The apparatus of claim 10 wherein said platform has a diameter with a central opening therethrough, and wherein said axial securement includes a rivet-type nut and screw.

12. The apparatus of claim 11 wherein said nut and said screw each include a head.

13. The apparatus of claim 7 wherein said mounting clip of said mount is an integrally formed spring clip.

14. A method adapted for line and lure restraint to enhance spin casting when using a spin casting rod having a tip and a reel seat with a reel mountable thereat, the method comprising the steps of rotatably mounting a magnet at a locating surface of a platform structure securable on the rod adjacent to the reel seat, the locating surface oriented facing away from the rod when the platform is secured thereto, wherein the magnet is rotatable on an axis through the locating surface of the platform structure and wherein the platform structure is configured so that the magnet is a selected distance toward the rod tip from the reel seat and with a selected lateral spacing from the rod.

15. The method of claim 14 wherein said selected distance is at least about 4.5 cm.

16. The method of claim 15 wherein the selected lateral spacing is at least about 3 cm.

17. The method of claim 14 wherein the platform structure is releasably securable on the rod.

* * * * *